E. U. KELLER.
SOCKET AND BOWL FOR FISHING TOOLS.
APPLICATION FILED JAN. 6, 1921.
1,407,867. Patented Feb. 28, 1922.
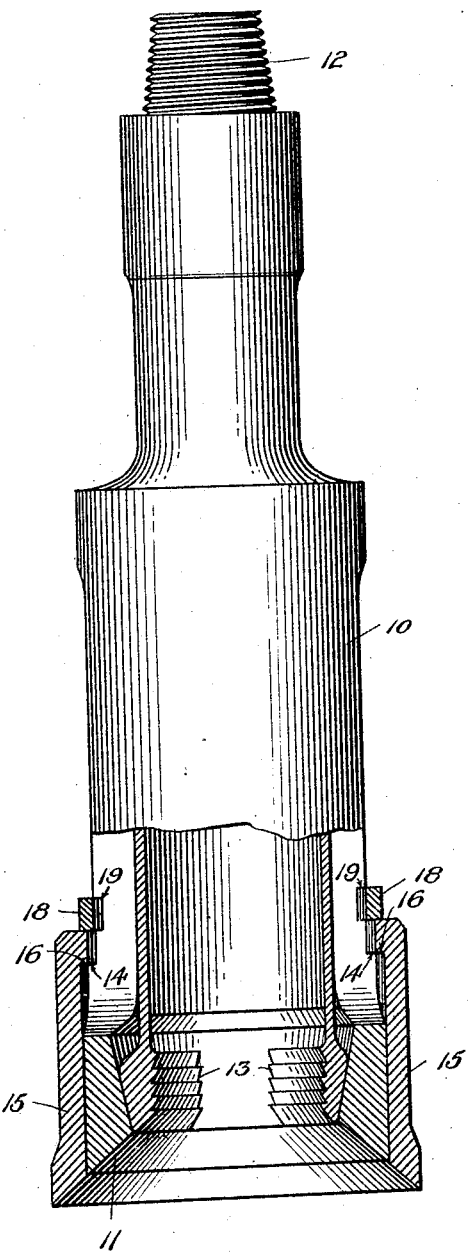
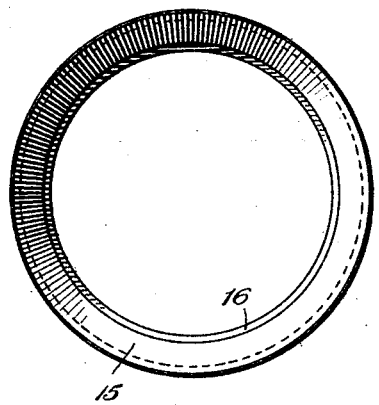
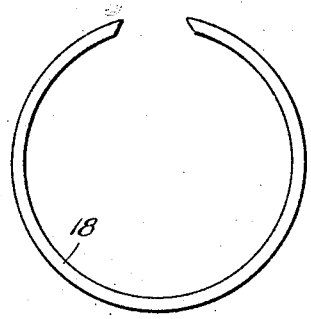
Witness
Edwin L. Bradford
Inventor
Ernest U. Keller
By
his Attorneys

UNITED STATES PATENT OFFICE.

ERNEST U. KELLER, OF PAWHUSKA, OKLAHOMA.

SOCKET AND BOWL FOR FISHING TOOLS.

1,407,867.  Specification of Letters Patent.  Patented Feb. 28, 1922.

Application filed January 6, 1921. Serial No. 435,440.

*To all whom it may concern:*

Be it known that I, ERNEST U. KELLER, a citizen of the United States, residing at Pawhuska, in the county of Osage and State of Oklahoma, have invented certain new and useful Improvements in Sockets and Bowls for Fishing Tools; and I do hereby declare the following to be a full, clear, and exact description of the same, reference being had to the accompanying drawings, forming a part of this specification.

This invention relates to tools commonly known in the well drilling art as fishing tools and are utilized for recovering other tools or implements lost in oil and gas wells during the drilling of the well. Very often two or three adjacent wells are of different diameter and it is not infrequent that the same well is of varying diameter as it is sunk in the earth. The fishing tool must fit more or less closely in the bore of the well to prevent the lost tool passing between the wall of the well and that of the socket and it is necessary, therefore, to provide a number of sockets, one for each size well, or provide means for accommodating one socket to the several wells.

The greater portion of the cost of a fishing tool is attributable to the socket and to eliminate the purchase of various size fishing tools it is well known practice to provide a series of bowls of increasing exterior diameters, any one of which can be secured to the socket of the fishing tool, depending on the size or diameter of the well in which the lost tool is lodged. Ordinarily, the bowl is secured on the socket in such manner that said bowl itself is apt to become lost in the well, due to the jarring and other strains under which the tool is placed, and an object of the present invention is to provide a socket and bowl wherein the liability of the bowl becoming detached from the socket and lost in the well is entirely eliminated.

In the accompanying drawings,—

Figure 1 is an elevation of a socket with the bowl attached thereto, the lower end of the tool being shown in section;

Fig. 2 is a detail view of the bowl; and

Fig. 3 is a detail view of the locking ring for securing the bowl on the socket.

As shown in the drawings the socket consists generally of a hollow cylindrical body portion 10, a throat portion 11 at its lower end and a screw threaded projection 12 at its upper end for attachment of means for lowering the socket down into the well. The interior wall of the throat portion 11 is flared in accordance with the usual practice to guide the end of the tool lost in the well into the interior of the socket where it will be grasped by suitable gripping members 13. The form of the gripping members or slips 13 forms no part of the present invention and need not be further described here nor illustrated to any extent in the drawings.

Frequently, as stated before, the diameter of the socket is considerably less than that of the well, leaving an appreciable space between the exterior wall of the socket and the wall of the well into which the end of the lost tool may possibly enter instead of entering the mouth of the socket. To overcome this difficulty without the necessity of keeping on hand a set of sockets of varying diameters, bowls of different exterior diameters are adapted to be secured on the lower end of the socket to increase the diameter of the tool as a whole. This attachment of the bowl has, however, been done in such a manner that the bowl sometimes becomes detached, permitting the bowl to drop off into the well and to avoid the loss of the bowl the present invention contemplates the provision of a bowl that can be placed on and removed from the socket by passing it over the upper end only of the socket, whereby the bowl cannot fall off in the well should the locking means be broken.

The preferred form of bowl, socket and locking means are illustrated in the accompanying drawings and consists in providing an enlargement at the lower end of socket 10, the upper end of this enlargement forming a shoulder 14 extending entirely around the socket. On the interior of the bowl 15, adjacent the top thereof, there is formed an inwardly extending shoulder 16 preferably extending around the bowl although if desired a plurality of short projections will suffice. The interior diameter of the bowl at the point where the shoulder 16 is formed is a trifle greater than the diameter of the body portion of the socket, but less than the diameter of the shouldered portion 14 of the socket, and the diameter of the bowl throughout the remainder of its length is substantially equal to that of the enlarged portion of the socket. This permits the bowl to be passed down over the upper end of the socket to the point where the projection 16 on the bowl will rest on the projection or shoulder 14 on the socket. It will be apparent that the bowl cannot possibly be removed from the enlarged end of the socket and the shoulder on the bowl is made sufficiently strong to withstand any strains placed upon it.

The bowl 15 having been placed on the socket as above described, it is adapted to be locked in its proper position against shoulder 14 by a locking ring in the form of a split steel spring ring 18. Ring 18 seats in an annular recess 19 in the socket, said ring, when contracted, being held against longitudinal movement on the socket by the shoulders formed by the upper and lower walls of recess 19. When it is desired to substitute one bowl for another, the bowl then on the socket can be readily removed by slightly expanding ring 19 beyond the outer surface of the socket, when the ring and bowl can both be passed up over the upper end of said socket.

Practically all vibrations set up in the bowl when the tool is in use are taken up by the shoulder 14 and the upper shoulder formed by recess 19 but both of these shoulders are well adapted to withstand any strains imparted to them. Should ring 18, by any chance, be broken the bowl could not be lost due to the enlarged lower end of the socket being larger than the interior diameter of the bowl.

What is claimed is:

1. In a fishing tool, the combination of a socket, said socket having an exterior shoulder formed thereon adjacent one end, a bowl adapted to be passed over the opposite end of the socket, a shoulder on the interior of the bowl adapted to engage the socket shoulder, and a removable locking member for locking said shoulders in engagement and preventing longitudinal movement of the bowl on the socket.

2. In a fishing tool, the combination of a socket having an enlarged end portion forming a shoulder, a bowl adapted to be passed over the opposite end of the socket, a shoulder on the bowl adapted to engage the socket shoulder, and a projection carried by the socket for locking the bowl against longitudinal movement on the socket, said projection being detachable to permit removal of said bowl.

3. In a fishing tool, the combination with a socket having a slot in its exterior face and a shoulder formed adjacent one end of said socket, of a bowl adapted to be passed over the opposite end of the socket, a shoulder on the interior of the bowl adapted to engage the shoulder on the socket, and an annular flexible ring seated in the slot in the socket, said ring projecting beyond the face of the socket into engagement with the bowl.

4. In a fishing tool, the combination with a socket having a shoulder formed adjacent one end, of a bowl adapted to be passed over the opposite end of the socket, a shoulder on the interior of the bowl adapted to engage the shoulder on the socket, and a detachable annular ring carried by the socket, said ring projecting beyond the exterior face of the socket into engagement with the bowl.

5. In a fishing tool, the combination with a socket having a slot in its exterior face and a shoulder formed adjacent one end of said socket, of a bowl adapted to be passed over the opposite end of the socket, a shoulder on the interior of the bowl adapted to engage the shoulder on the socket, and an annular flexible ring seated in the slot in the socket and projecting beyond the face of the socket into engagement with the bowl, said ring being split and detachable from the socket to permit removal of the bowl.

6. In a fishing tool, the combination of a socket having an enlarged end portion, a bowl carried by the socket, the interior diameter of the bowl being reduced adjacent one end of the bowl and less than the diameter of the enlarged portion of the socket, the interior diameter of the remainder of the bowl being greater than the enlarged end portion of said socket, whereby movement of the bowl longitudinally of the socket in one direction is prevented, and detachable means for preventing movement of the bowl on the socket in the opposite direction.

7. In a fishing tool, the combination of a socket having a body portion with a recess therein and an enlarged end portion, a bowl carried by the socket, the interior diameter of said bowl being reduced at one end and less than the diameter of the enlarged portion of the socket, the interior diameter of the remainder of the bowl being greater than the enlarged end portion of said socket, whereby movement of the bowl longitudinally of the socket in one direction is prevented, and a detachable projection seated in the recess in the socket and in engagement with the bowl for preventing movement of said bowl in the opposite direction.

8. In a fishing tool, the combination of a socket having a body portion with a recess therein and an enlarged end portion, a bowl carried by the socket, the interior diameter of said bowl being reduced at one end and less than the diameter of the enlarged end portion of the socket, the interior diameter of the remainder of the bowl being greater than the enlarged end portion of said socket, whereby movement of the bowl longitudinally of the socket in one direction is prevented, and a yieldable, resilient projection seated in the recess in the socket and in engagement with the bowl for preventing movement of said bowl in the opposite direction.

ERNEST U. KELLER.